July 1, 1924.

B. M. W. HANSON

CHUCK

Filed Feb. 10, 1922

1,499,728

Inventor
Bengt M. W. Hanson

By T. Clay Lindsey
His Attorney

Patented July 1, 1924.

1,499,728

UNITED STATES PATENT OFFICE.

BENGT M. W. HANSON, OF HARTFORD, CONNECTICUT.

CHUCK.

Application filed February 10, 1922. Serial No. 535,659.

*To all whom it may concern:*

Be it known that I, BENGT M. W. HANSON, a citizen of the United States, and a resident of Hartford, county of Hartford, State of Connecticut, have invented certain new and useful Improvements in a Chuck, of which the following is a specification.

This invention relates generally to chucks, for instance, such as are employed for holding pieces of work on the spindle of a metal working machine.

The aim of the invention is to provide a chucking mechanism having various features of novelty and advantage, and which is particularly characterized by its simplicity and strength in construction, its effectiveness in operation, and its capability of being expeditiously adjusted to accomodate pieces of work of various sizes within a relatively wide range.

In the accompanying drawing, wherein I have shown for illustrative purposes one embodiment which the invention may take, Fig. 1 is a vertical view taken longitudinally and centrally through the device of the present invention;

Figure 1:
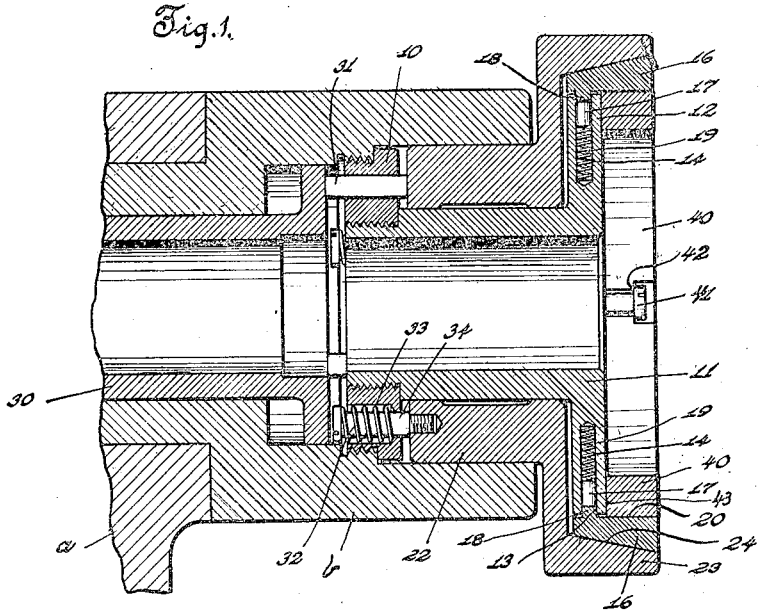

Referring to the drawing in detail, *a* denotes a suitable support or bearing member in which is journalled a rotary member *b*, here shown as being in the form of a spindle, the forward end of which is chambered and counterbored, as illustrated. Extending into the chamber at the forward end of the spindle and connected to this spindle against relative rotary and longitudinal movements, as by means of a ring nut 10, is the sleeve 11 of what may be termed a jaw supporting member. This sleeve, at its forward end, is provided with a radially extending flange 12 having in its edge a circumferential groove 13 and angularly spaced apart, radially disposed recesses 14. 16 designates jaw members having, adjacent their inner ends, studs 17 slidably mounted in the recesses 14 and ribs 18 which are received by the circumferential groove 13. The interengaging ribs and grooves 18 and 13 hold the jaws against turning movement about the studs 17. The jaws are normally urged radially and outwardly by springs 19 positioned within the recesses 14. It will be seen that the jaws 16 extend forwardly of the jaw supporting member or flange 12, and the active faces 20 of these jaws may be curved about the axis of rotation of the spindle as a center.

Surrounding the jaw supporting member, and having longitudinal movement relative thereto and to the spindle, is a member for actuating the jaws, and this member comprises a sleeve 22 positioned for sliding movement between the cylindrical portion 11 and the wall of the chamber of the spindle, and a recessed head 23 which surrounds and engages the jaw members 16. The internal peripheral wall 24 of the head is preferably conical or tapered, as shown, this wall is provided with spaced jaw seats in the form of grooves 25. These grooves, considered lengthwise, are inclined towards the axis of the head, but, considered solely by themselves, the walls of the grooves are non-tapering. In the present instance, the bottom or central line of each groove is parallel to the surface of the tapered recess, and the grooves in cross section are particylindrical. Thus, while the grooves converge towards the axis of rotation of the spindle, each of the grooves within itself is non-tapering.

The outer surfaces of the jaws 16 correspond with the cross sectional shape of the grooves or seats 25 and are straight, as shown, so as to have a surface bearing throughout their lengths in the grooves or seats in any position of longitudinal adjustment. It will be noted with this arrangement that there will always be a perfect surface contact between each jaw and its seat over the entire surface of the jaw and in any position in which it may be adjusted, and thus the jaws are at all times firmly supported, wear between the jaws and head is reduced to a minimum, and since, at no time, is there any crevice between the back surface of the jaws and the head, chips or the like can not find their way between these surfaces and affect the operation of the jaws.

The jaw actuating member is moved longitudinally in a direction to cause it to move the jaws into gripping relation with the work by a push bar 30 slidably mounted in the spindle *b* and acting through pins 31 slidably mounted in the ring 10 and abutting at their respective opposite ends against the push bar 30 and the sleeve 22. Any suitable means may be provided at the rear end of the push bar for advancing and with-drawing the same. It will be noted that when this bar is advanced, the jaw actuating member is forced forwardly and, owing to the inclined walls of the grooves 25, the jaws are forced into gripping relation to the work, and this operation is brought about without moving the jaws longitudinally of the work spindle; that is to say, the jaw supporting member including the flange 12, and the jaws supported thereon, are fixed against movement relative to the spindle. This means that if a piece of work as positioned within the jaws has a predetermined relation to a tool, for instance, the position of this piece of work is not disturbed when it is gripped by the collet. It will be further noted that the front face of the flange 12 presents a flat abutment positioned within the compass of the jaws and having fixed relation to the spindle. The end of the pieces to be held may be brought into engagement with this surface which acts as a gage, so to speak, for properly positioning the work relative to a tool.

It will be noted that the front face or surface of the flange 12 does not change its relation to the spindle, that is, it does not become cocked or canted when the jaws are forced into gripping relation to the work. When it is desired to release the work, the push bar 30 is withdrawn inwardly of the spindle, and the springs 32 will retract the jaw actuating member. These springs are located within recesses 33 in the ring 10 and are positioned about bolts 34 having threaded engagement with the sleeve 22. For the purpose of preventing rotary movement between the jaw supporting member and the jaw actuating member while permitting longitudinal movement therebetween, a screw 35 is fixed to the forward end of the sleeve 22 and loosely extends into an opening 36 in the flange 12.

Figure 2:
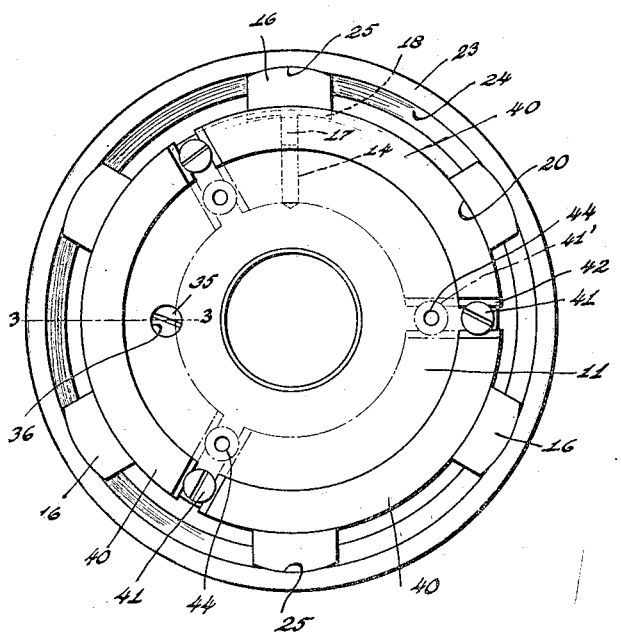
Fig. 2 is a front end view.
Figure 3:
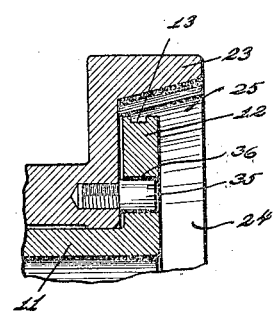
Fig. 3 is a detail view taken substantially on line 3—3 of Fig. 2.

For the purpose of increasing the range of usefulness of the chuck, that is, to enable it to hold pieces of work varying considerably in diameter from one another, I provide supplemental jaws which are here shown in the form of segments 40. These supplemental jaws or segments are supported for ready attachment to and detachment from and for radial movement on the flange 12 and within the regular jaws 16. In the present illustrative disclosure, each of the jaws is in the form of a segment of a ring substantially concentric to the axis of rotation of the chuck and two jaws cooperate with each of these segments. The segments are connected to the front face of the flange 12 by screws 41 positioned between the adjacent ends of the segments. It will be seen that the ends of the segments are stepped so as to provide ledges or tongues 42 against which the inner face of the head of the screw 41 engages. There is sufficient clearance between the periphery of the screw and the ends of the segments to permit the segments to move radially a sufficient distance to grip the work but not enough to become disengaged from the screws. The screws securely hold the rings against the flat face of the flange 12 and there is, therefore, little or no danger of chips or the like finding access between the contacting surfaces 43 of the segments and the flange. It will be understood, of course, that a plurality of sets of supplemental jaws may be provided, and the jaws of one set will be of a different width than those of other sets. Where a piece of work of relatively small diameter is to be supported in the chuck, wide supplemental jaws, as indicated by dotted lines, Fig. 2, may be employed, and in addition to the screws 41 another set of screws 41' threaded into the openings 44 may be utilized to hold the jaws in place on the flange member.

It will be seen, with the construction described, that supplemental jaws of the proper width depending on the diameter of work to be held may be very quickly attached to the jaw supporting member. The supplemental jaws may be moved radially apart to receive the work and when these supplemental jaws are forced by the regular jaws into gripping engagement with the work, they firmly hold the same in correct position.

It is, of course, obvious that the invention is susceptible of various modifications and changes which are within the spirit of the invention without departing from the scope of the following claims, it being understood that the present disclosure of my invention is by way of illustration only and it is not to be taken as restrictive of my conception.

I claim as my invention:—

1. In a device of the character described, a spindle having a jaw supporting part, gripping members mounted thereon for radial movement, supplemental jaws, and screws for securing said jaws to said part, said screws being positioned between and having their heads overlapping the adjacent ends of said jaws.

2. In a device of the character described, a spindle having a jaw supporting part, gripping members supported thereon for radial movement, supplemental jaws comprising ring sections engaging against the active faces of said gripping members, and screws threaded into said part and positioned between and having their heads overlapping the adjacent ends of said supplemental jaws.

3. In a device of the character described, a spindle having a jaw supporting part, gripping members supported thereon for radial movement, supplemental jaws comprising ring sections engaging against the active faces of said gripping members and each having each of its ends stepped to form tongues of reduced thickness, and screws threaded into said part and positioned between the adjacent ends of said sections with their heads overlapping said tongues.

4. In a device of the character described, a spindle, a jaw supporting member having a flat front face forming an abutment against which the work is adapted to be brought into engagement, gripping members supported for radial movement on said member and having their active faces extending forwardly of the front face thereof, supplemental jaws comprising ring sections positioned against said flat face and in cooperative relation to said gripping members, means for retaining said supplemental jaws on said jaw supporting member for radial movement, a head having a tapered wall surrounding and engaging the outer faces of said gripping members, and means for moving said head longitudinally of the spindle to force said gripping members together.

5. In a device of the character described, a spindle having a chamber at its forward end, a jaw supporting member including a cylindrical portion having its rear end fixed to the wall of the chamber and having a flange at its forward end, jaw members supported on the periphery of said flange for radial movement, a jaw actuating member having a sleeve portion fitting between the wall of said chamber and said cylindrical portion and also having a head provided with a tapered wall engaging said jaws, and means for moving said jaw actuating member in a direction to force the jaws together.

BENGT M. W. HANSON.